United States Patent [19]

Depenbrock

[11] Patent Number: 4,678,248

[45] Date of Patent: Jul. 7, 1987

[54] DIRECT SELF-CONTROL OF THE FLUX AND ROTARY MOMENT OF A ROTARY-FIELD MACHINE

[75] Inventor: Manfred Depenbrock, Bochum-Stiepel, Fed. Rep. of Germany

[73] Assignee: Brown, Boveri & Cie AG, Mannheim, Fed. Rep. of Germany

[21] Appl. No.: 788,816

[22] Filed: Oct. 18, 1985

[30] Foreign Application Priority Data

Oct. 20, 1984 [DE] Fed. Rep. of Germany ....... 3438504

[51] Int. Cl.$^4$ .................................................. H02P 7/36
[52] U.S. Cl. ...................................... 318/805; 318/799
[58] Field of Search ............... 318/768, 799, 800, 801, 318/802, 804–810

[56] References Cited

U.S. PATENT DOCUMENTS

| | | | |
|---|---|---|---|
| 4,078,191 | 3/1978 | Morters et al. | 318/799 |
| 4,230,979 | 10/1980 | Espelage et al. | 318/802 X |
| 4,338,559 | 7/1982 | Blaschke et al. | 318/805 |
| 4,349,772 | 9/1982 | Weiss | 318/799 |
| 4,400,655 | 8/1983 | Curtiss et al. | 318/805 X |
| 4,447,787 | 5/1984 | Schwesig et al. | 318/805 X |
| 4,450,398 | 5/1984 | Bose | 318/806 X |
| 4,477,763 | 10/1984 | Asano et al. | 318/807 X |
| 4,524,310 | 6/1985 | Nagase et al. | 318/808 |
| 4,593,240 | 6/1986 | Blaschke | 318/800 |

*Primary Examiner*—Patrick R. Salce
*Assistant Examiner*—Marc S. Hoff
*Attorney, Agent, or Firm*—Herbert L. Lerner; Laurence A. Greenberg

[57] ABSTRACT

A method for controlling a rotating-field machine supplied from an inverter, the output voltage system of the inverter being variable with respect to amplitude, phase and frequency includes supplying amplitudes of stator flux components formed from measured stator current components and stator voltage components as actual value of a flux control loop, and changing the phase and frequency of the inverter output voltage system with a flux control as a function of a predetermined stator flux reference value by directly setting-in the switching state of the inverter and an apparatus for carrying out the method.

15 Claims, 9 Drawing Figures

DIRECT SELF-CONTROL OF THE FLUX AND ROTARY MOMENT OF A ROTARY-FIELD MACHINE

The invention relates to a method and apparatus for controlling a rotating-field machine which is supplied by an inverter having an output system that is variable with respect to amplitude, phase and frequency.

Such a method and such an apparatus are known from the article by R. Gabriel, entitled "Mikrorechner-geregelte Asynchronmaschine, ein Antrieb für hohe dynamische Anforderungen" (Microcomputer-controlled Asynchronous Machine, a Drive for Stringent Dynamic Requirements), Regelungstechnik 32, (1984), Pages 18 to 26.

In order to supply rotating-field machines having a torque which can be highly dynamically set in a wide range of speeds to desired values, pulsed inverters (d-c/a-c converters) with a constant d-c input voltage are usually used, frequently in conjunction with a field-oriented control method. Normally, such a drive system is sufficient even for the highest technical requirements as to the quality of control. Assuming terminal currents which can be impressed in any desired manner, in principle the magnetic flux and the torque of a rotating-field machine can be set continuously to desired values; however, this is possible only if all electromagnetic system parameters of a sufficiently accurate descriptive model of the machine are known.

Starting from the measured values of the terminal currents and the speed, the corresponding terminal voltages can be determined continuously by means of a complicated signal processing system as a function of a reference quantity, such as the torque. The type of signal processing depends, among other things, on the chosen form of description for the drive system. Thus, there are methods which start out from the system presentation by state equations such as, for instance, in the paper by R. Jötten and H. Schierling, entitled "Control of the Induction Machine in the Field Weakening Range, Control in Power Electronics and Electric Drives", IFAC Symposium, Lausanne, 1983, Conference Record, Pages 297 to 304.

Other proposals are based on the description of systems by means of transfer functions. The result of the signal processing, namely the wave shape of the required terminal voltages is, ideally independent of the chosen approach to the problem.

In order to simplify the description equations and to facilitate the visual understanding of all of the processes, it is customary to combine all of the similar quantities of the different machine legs or phases to form a space vector for each. The projection of the space vector which generally changes with time, onto defined axes, results in the waveshapes associated with these axes of the corresponding quantities. The relationships between the presentations in different reference systems, such as a-b-c (stator winding axes); $\alpha$-$\beta$ (orthogonal stator axes); d-q (orthogonal rotor axes), etc. can likewise be perceived clearly by means of the space vector presentation.

The following difficulty experienced with conventional control systems can also be understood easily: In the normal three-phase inverter with constant d-c input voltage, the space vector of the output voltages which has two linearly independent components, can assume only seven discrete values. None of these seven possible space vector values agrees in general with the desired instantaneous value of the space vector which is determined from the reference values of the machine voltages obtained continuously at great cost. The desired agreement can therefore be obtained only on the average over a finite time interval, such as by pulse width modulation. If a very good dynamic behavior of the control is required, the averaging time or the pulse repetition time, must then therefore be chosen correspondingly short.

The continuous determination of the control inputs for the stator control quantities of a rotating-field machine is so complicated that methods based on analog computing have not found acceptance in practice for economic reasons, especially since the requirements as to accuracy of the computer elements and the constancy of the circuit characteristics are very stringent.

By digital signal processing by means of high-performance microprocessors (see, for instance, the literature cited above), the amount of equipment for the signal processing can be reduced so that economic reasons are no longer the main obstacle for a wider application. Nevertheless, improvements are desired with the present methods in regard to the following weak points: In the case of particularly high dynamic requirements as to the control of the rotating-field machine, the pulse frequency must likewise be made high. This has an unfavorable effect on the efficiency and the cost of the inverter.

In the known control methods, there is furthermore a heavy dependence of the drive properties on machine parameters which change in operation, such as, for instance, the rotor resistance and the main and stray inductances, etc.

Additionally, the control relationships for the pulse width modulation change to a large extent with the assumed optimizing criteria. They depend on the drive problem as well as on the apparatus-wise solution for the power section.

The heavy parameter dependency requires continuous determination of the parameters by additional measurements or additional identification calculations. For stringent requirements with regard to the control dynamics on one hand and good utilization of inverters and the machine on the other hand, the method of pulse modulation requires complicated and therefore expensive multi-phase modulation devices (see, for instance, the following publications: J. Eibel, R. Jötter, "Control of a 3-Level-Switching Inverter Feeding a 3-Phase A.C. Machine by a Microprocessor", ETG-Fachberichte, Volume 11, Pages 217 to 222, VDE-Verlag 1982; A. Pollmann, "A Digital Pulse Width Modulator Employing Advanced Modulation Techniques", IEEE-IAS ISPC-Conference, 1982, Orlando; G. Gierse, W. Schürmann, "Microprocessor Control for Two Magnetically Coupled Three-Phase PWM Inverters", PESC 1984, Conference Record, Pages 162 to 169).

In a realization in microcomputer technology, a separate high-performance microprocessor with the associated periphery modules is required for this purpose, as a rule.

In order to prevent difficulties resulting from the increase of the pulse frequency and an optimized pulse width modulation, various methods for the direct control of the machine currents have already been proposed (see in this connection, for instance, the publication by G. Pfaff and A. Wick entitled "Direkte Stromregelung bei Drehstromantrieben mit Pulswechselrichter" (Direct Current Control for 3-Phase Drives with Pulsed Inverter), Regelungstechnische Praxis 24 (1983), Pages 472 to 477).

However, the problem of the remaining expensive processing in order to obtain the input values for direct current control and the heavy dependency on parameters, remain unsolved.

In order to obtain better utilization of the inverter, it is furthermore proposed in the last-mentioned publication to again use a pulse modulation method in conjunction with a dynamically good direct current control. With respect to the cost, however, it would seem that no appreciable reduction can be achieved as compared to the other methods.

It is accordingly an object of the invention to provide a method and apparatus for controlling a rotating-field machine, which overcomes the hereinafore-mentioned disadvantges of the heretofore-known devices of this general type, which assures very good dynamic properties without expensive signal processing and is furthermore not parameter-sensitive.

With the foregoing and other objects in view there is provided, in accordance with the invention, a method for controlling a rotating-field machine supplies from an inverter, the output voltage system of the inverter being variable with respect to amplitude, phase and frequency, which comprises supplying amplitudes of stator flux components formed from measured stator current components and stator voltage components as actual values of a flux control loop, and changing the phase and frequency of the inverter output voltage system with a flux control as a function of a predetermined stator flux reference value by directly setting-in the switching state of the inverter.

The advantages attainable with the invention are in particular that for the signal processing, neither information regarding the speed of revolution of the shaft nor regarding other rotor quantities and rotor parameters (inductances, resistances) are needed. The method works without pulse width modulation, is little sensitive to parameters and exhibits very good dynamic properties. The control properties of pulse-controllable inverters with constant input d-c voltage are optimally utilized.

Further in accordance with the objects of the invention, there is provided an apparatus for controlling a rotating-field machine, comprising: an inverter having an output voltage system being connected to the rotating-field machine and being variable with respect to amplitude, phase and frequency; an integrator connected to said inverter and a component converter connected to said integrator for forming amplitudes of stator flux components from measured stator current components and stator voltage components as actual values of a flux control loop; means for supplying a predetermined stator flux reference value; and a flux control in the form of a comparator having inputs connected to said component converter for receiving the amplitudes of the flux components and to said supplying means for receiving said stator flux reference value, and said flux control having an output connected to said inverter for delivering switching state variables for driving said inverter, said flux control changing the phase and frequency of the inverter output voltage system as a function of said stator flux reference value.

Other features which are considered as characteristic for the invention are set forth in the appended claims.

Although the invention is illustrated and described herein as embodied in a method and apparatus for controlling a rotating-field machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
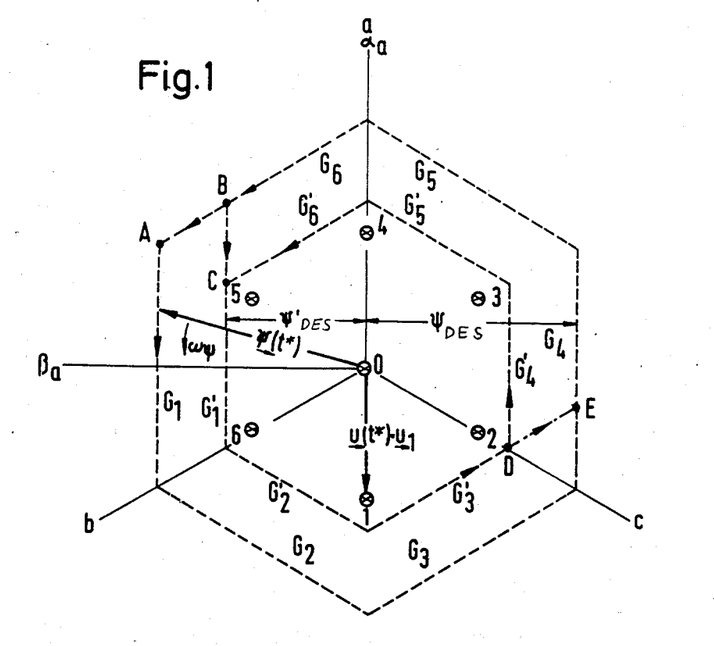
FIG. 1 is a graph of the space vector of stator voltage, total flux and space vector track curves.

Referring now to the figures of the drawings in detail and first, particularly, to FIG. 1 thereof, there are seen space vectors of the stator voltage and of the total flux as well as the flux space vector track curves, for explaining the direct self-control for the flux in the field-weakening range of a rotating-field machine.

If a rotating-field machine is supplied by a three-phase inverter while the d-c input voltage is constant, the voltage space vector $\vec{u}(t)$ (space vector of the stator voltage) can only assume seven discrete values. In FIG. 1, these discrete values are characterized by the points 0 . . . 6. The instantaneous value of the voltage space vector for point 1 is designated with reference symbol $u_1$. Similarly, the space vector values for the points 0, 2, 3, 4, 5 and 6 are designated with reference symbols $u_0$, $\vec{u}_2$, $\vec{u}_3$, $\vec{u}_4$, $\vec{u}_5$ and $\vec{u}_6$, respectively. In FIG. 1, the voltage space vector $\vec{u}(t^*) = \vec{u}_1$ at the time $t^*$ is shown.

For a fundamental frequency clock, the space voltage vector $\vec{u}(t)$ assumes the discrete values determined by the points $\vec{1}$ . . . 6 in cyclic sequence, and the dwelling time at each point is one sixth of the voltage period in steady-state operation. The wave shape of the three stator winding voltages is obtained as the projection of the voltage space vector $\vec{u}(t)$ which moves counter-clockwise in jumps to the three stationary stator winding axes (projection axes) a-b-c. Similarly, linearly independent $\alpha$ and $\beta$ components of the three-phase voltage systems are obtained as projections on mutually orthogonal, similarly stationary stator axes $\alpha$, $\beta$ such as the $\alpha_a$ and $\beta_a$ axes shown in FIG. 1. The position of the projection axes $\alpha_a$ and $\beta_a$ is characterized by the fact that the a and $\alpha_a$ axes coincide.

If one ignores the voltage $|\vec{i}| \cdot R_s$ ($R_s$ = stator winding resistance, $|\vec{i}|$ = stator current) which as a rule is small in the field weakening range, as compared to the stator voltage $|\vec{u}|$ which drops across the copper resistances of the stator windings, then the respective instantaneous value of the voltage space vector $\vec{u}(t)$ unequivocally determines the change of the instantaneous position of the flux space vector $\vec{\psi}(t)$ (space vector for the total flux) with respect to speed and direction. In FIG. 1, the flux space vector $\vec{\psi}(t^*)$ at the point in time $t^*$ is shown.

With a stationary fundamental frequency clock, the end of the flux space vector therefore traverses an even-sided hexagon with constant track velocity and slightly pulsing angular velocity $\omega\psi$ as shown in FIG. 1. The straight lines of track of the hexagon are designated with reference symbols $G_1$, $G_2$, $G_3$, $G_4$, $G_5$, $G_6$ or with $G_1'$ ... $G_6'$. In the case of a fundamental frequency clock, the only possibility for influencing the torque of the rotating-field machine is by controlling the time intervals between the switching processes of the voltage space vector. Due to the constant track velocity of the flux space vector, a relatively small average angular velocity $\overline{\omega}\psi$ is obtained when a large hexagon with the straight track lines $G_1 \ldots G_6$ is traversed. If the switching frequency is increased, the rotation occurs on a smaller hexagon with the straight track lines $G_1' \ldots G_6'$, and the average angulr velocity $\overline{\omega}\psi$ is increased. With the shaft speed unchanged, the average slippage and thereby the torque are changed, such as in an induction machine.

In order to prevent unnecessary transients, the dynamic change of the rotary track of the flux space pointer must take place in such a way that the new track runs symmetrically to the point of origin of the flux space vector $\vec{\psi}(t)$, like the old one. Due to the direct flux self control, this can be achieved substantially more simply than heretofore. Switching-on the various voltage space vector values $\vec{u}_1 \ldots \vec{u}_6$ proceeds in accordance with the following rule:

The switching state of the inverter associated with the voltage space vector value $\vec{u}_1$, for instance, must be established exactly at the moment in which the flux component $\psi\beta_a$ (the projection of $\vec{\psi}(t)$ onto the $\beta_a$ axis) reaches the value which is equal to the desired origin distance $\psi_{DES}$ i.e. the desired distance of the straight track line $G_1$ from the origin of the flux space vector (point 0 or control input for the flux magnitude). In the case of stationary circulation on the large hexagon, this is the case at the point A. If, on the other hand, the origin distance of the track curve is suddenly reduced during the motion of the flux base vector $\vec{\psi}(t)$ on the straight track line $G_6$ with the value $\psi_{DES}'$, the switching-over of the inverter automatically takes place correctly at the point B.

After further stationary operation with increased average angular velocity of the flux space vector, the flux space vector traverses the inner hexagon. The voltage space vector value $\vec{u}_1$ is then set at the point C every time. If the distance from the straight track to the origin of the flux space vector is finally increased again to the old reference value $\psi_{DES}$, such as if the straight track line $G_3'$ is traversed, the voltage space vector value $\vec{u}_4$ is not switched-on at the point D as usual, but only later and automatically correctly at the point E, because it is only at this point that the negative flux component $(-\psi\beta_a)$ reaches the new distance from the origin $\psi_{DES}$.

As already mentioned, the position of the projection axes $\alpha_a$ and $\beta_a$ is characterized by the feature that the a and the $\alpha_a$ axes coincide. Similarly, the $\alpha_b$, $\beta_b$ and $\alpha_c$, $\beta_c$ axes as well as the associated flux magnitudes $\psi\beta_b$ and $\psi\beta_c$ can be defined. A comparison of all three flux magnitudes $\psi\beta_a$, $\psi\beta_b$ and $\psi\beta_c$ with the predetermined origin distance $\psi_{DES}$ furnishes the criteria for the automatic advancing of the voltage space vector with fundamental frequency clocking in the manner described.

Figure 2:
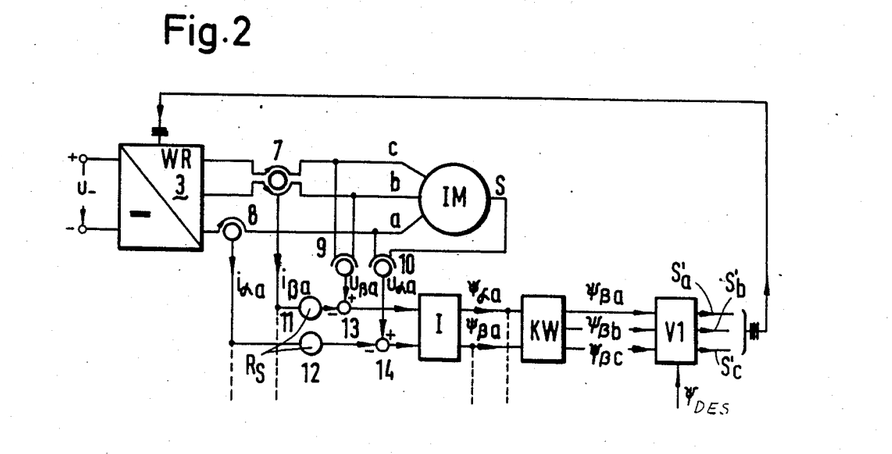
FIG. 2 is a schematic circuit diagram of a signal processing device for direct flux self-control.

In FIG. 2, a possible signal processing structure for the direct self-control of the total flux of a rotating-field machine is shown as a function of an input variable for the amount of flux. For instance, the distance $\psi_{DES}$ from the origin can be derived in this case from the shaft speed and/or a torque regulator and be set in as a control input.

In detail, a three-phase inverter WR is shown, to which a constant d-c input voltage U_ is applied on the input side, and which supplies the windings assigned to the stator winding axes a, b, c of an induction machine IM with three-phase a-c voltage, on the output side. The switching state of the inverter, for instance the connected instantaneous value of the voltage space vector $\vec{u}$, is determined by a logical combination of signals $S_a'$, $S_b'$, $S_c'$ or $S_a$, $S_b$, $S_c$ (in this connection reference should be made to the publication by W. Kuhn, entitled: Steady-State Behaviour of Induction Machines fed by a Frequency Converter which is Supplied by a DC Link with an AC component, 2. IFAC symposium, Page 788).

In order to obtain the stator current component $i\beta_a$ (the projection of the stator current space vector $\vec{i}$ onto the $\beta_a$ axis) a current transformer (differential current transformer) 7 is provided, through which the currents of the windings assigned to the stator winding axes b and c flow. The current flowing through the winding of the stator winding axis a, i.e. the stator current component $i\alpha_a$ (the projection of the stator current space vector onto the $\alpha_a$ axis) is picked up by a current transformer 8. This direct pickup of $i\alpha_a$ and $i\beta_a$ is a modification of the generally known 120°/90° transformation of the currents.

The stator current component $u\beta_a$ (projection of the voltage space vector $\vec{u}(t)$ onto the $\beta_a$ axis) is determined by a voltage transformer 9, the terminals of which are connected to the windings belonging to the stator winding axes b and c. In order to obtain the stator voltage component $u\alpha_a$ (the projection of the voltage space vector $\vec{u}(t)$ onto the $\alpha_a$ axis) a voltage transformer 10 is provided. The terminals of the voltage transformer 10 are connected to the winding belonging to the stator winding axis a, as well as to the neutral or star point S of the machine IM.

The stator current components $i\beta_a$ and $i\alpha_a$ are multiplied by the stator winding resistance $R_s$ by means of multipliers 11 or 12 and the products are fed with a negative sign to comparison points 13 and 14. The stator voltage components $u\beta_a$ and $u\alpha_a$, respectively, are applied to these comparison points 13 and 14 with a positive sign. The difference signals $u\alpha_a - i\alpha_a \cdot R_s$ or $u\beta_a - i\beta_a \cdot R_s$ at the comparison points 13 and 14 are fed to an integrator I.

The integrator I forms first flux components $\psi\beta_a$ and $\psi\alpha_a$ from the difference signals and feeds these to a component converter KW. The component converter KW determines second flux components $\psi\beta_a$, $\psi\beta_b$ and $\psi\beta_c$ from the first flux components and feeds the second flux components to a comparator V1. The comparator V1 feeds the switching state variables $S_a'$, $S_b'$, $S_c'$ to the inverter WR as a function of the comparison between $\psi\beta_a$, $\psi\beta_b$, $\psi\beta_c$ and the origin distance $\psi_{DES}$ (the control input for a magnitude of the flux). The switching state variables $S_a'$, $S_b'$, $S_c'$ give the individual voltage space vector values $\vec{U}_0 \ldots \vec{U}_6$ in accordance with the following table:

| $S_a'$ | $S_b'$ | $S_c'$ | |
|---|---|---|---|
| H | L | L | $\vec{U}_1$ |
| H | H | L | $\vec{U}_2$ |
| L | H | L | $\vec{U}_3$ |
| L | H | H | $\vec{U}_4$ |
| L | L | H | $\vec{U}_5$ |
| H | L | H | $\vec{U}_6$ |
| H | H | H | $\vec{U}_0$ |
| L | L | L | $\vec{U}_0$ |

(L = Low, H = High)

The direct flux self control described above permits the fastest possible change of the total amount of flux $|\psi|$ to occur without unnecessary transients, if fundamental frequency clocks are used. Neither information regarding the speed of rotation nor regarding other rotor quantities and rotor parameters are needed. The relationship between currents and fluxes which as a rule are non-linear, have practically no influence at all on steady-state and dynamic processes, just like changes of the input d-c voltage U— of the inverter. Only the resistance $R_s$ of the stator windings enters into the signal processing as a parameter with a slight influence. If necessary, the operational changes of this parameter can readily be taken into consideration, such as through a temperature-controlled adaptor.

The principle of direct self-control for the torque of a rotating-field machine is explained below by way of an embodiment for the short circuit rotor variant of an induction machine. This principle can similarly be applied to synchronous machines regardless of whether they have solid pole or salient pole rotors, whether they are excited by a current or by permanent magnets or whether structures with or without a damper winding are considered.

Normally, it does not make sense to increase the magnitude of the resulting magnetic flux of a rotating-field machine beyond its rated or design value. Since the track velocity of the flux space vector is constant, an average angular velocity of the flux space vector cannot fall below a certain value for fundamental frequency timing with only six discrete values of the voltage space vector. If the track curve of the flux space vector is constant, its mean angular velocity can then only be reduced by reducing the average track velocity.

If the current-proportional voltages at the copper resistance of the stator windings are neglected, the track velocity can be reduced very simply to the value zero in a three-phase inverter with constant d-c input voltage. This is done by inserting the seventh voltage space vector value $\vec{u}_0$, the magnitude of which has the value 0.

Each random intermediate value can be set by the choice of the duration of two partial intervals of the track velocity averaged over a pulse cycle formed of a first partial interval with an unreduced track velocity of the flux space vector and a second partial interval with a flux space vector which is stationary relative to the stator axes.

For a simpler description, the hexagonal track curve of the flux space vector can be approximated by a circle. The essence of the dynamic processes when switching from one of the six outer voltage space vectors to the central seventh voltage space vector and vice versa is then as follows:

In the partial interval with full machine voltage, the angular velocity of the part of the resulting flux interlinkage has the value $\omega_0$ relative to the stator which is assigned to the fundamental speed of revolution. If the shaft rotation is constant in the region between the base speed of rotation and stand-still, the slippage of the rotor then has a very large positive value, for instance $s = +0.5$ at half the basic speed of rotation. If the flux rotation relative to the stator is held up because all of the stator voltages have reached zero, the direction of the flux rotation relative to the rotor is reversed with the shaft rotation unchanged and the slippage assumes very large negative values, such as $s = -0.5$ at half the basic speed.

Starting out from any desired starting condition within the normal operating range, the dynamics of all important quantities are seen in a simple manner if the amount of slippage is increased in step fashion to a value which is large as compared to the slippage $s_K$ and the transition into the associated stationary state is considered. The essence of all processes can also be recognized with sufficient clarity if the following further ideal assumptions are made:

1. The induction machine is described sufficiently accurately by a linear fundamental wave model free of current displacement.
2. By appropriate control of the stator voltages, the amount of the resulting flux interlinkage is kept constant and only the speed of rotation of the related space vector is changed in step fashion.
3. The shaft speed remains unchanged during the time being considered.

Figure 3:
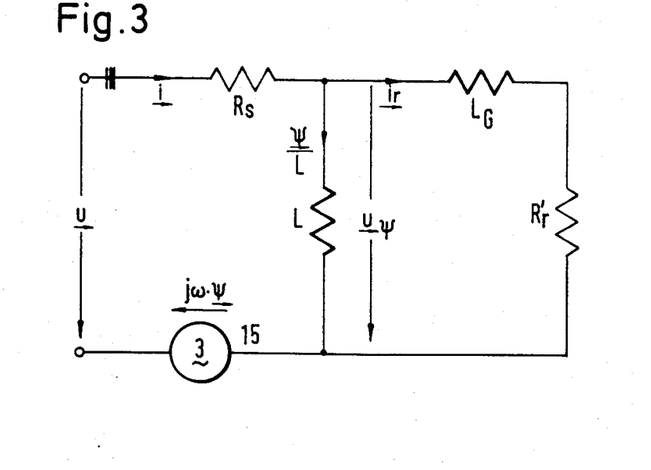
FIG. 3 is an equivalent schematic circuit diagram for the space vector quantities of a linear fundamental wave induction machine which is free of current displacement.

On the basis of these three assumptions, all processes can be described correctly by means of the space vector equivalent circuit diagram shown in FIG. 3 for an observer which is at rest relative to the rotor (reference system with the rotor rotating). In contrast to the generally known T-equivalent circuit, the rotational voltage is shifted to the stator side and the leakage is shifted to the rotor side in the equivalent circuit diagram according to FIG. 3. The stator winding resistance $R_s$ is connected to the first terminal of the equivalent circuit diagram. The current flowing through the stator winding resistance $R_s$ is described by the stator current space vector $\vec{i}$. On the other hand, the rotating field inductance L and the stray field inductance $L_G$ are connected to the stator winding resistance $R_s$. The magnetizing current flowing through the rotating-field inductance L is described by the space vector $\vec{\psi}/L$. The voltage at the rotating field inductance L induced by the flux space vector $\vec{\psi}$ is $\vec{U}\psi$.

The current flowing through the leakage field inductance L is described by the rotor current space vector $\vec{i}_r$. On the other hand, the leakage field inductance $L_G$ is connected through the rotor resistance $R_r'$ to the further terminal of the rotating-field inductance L and to a rotary or rotational voltage source 15. The voltage space vector of the rotary voltage source 15 is $j\omega\vec{\psi}$, were $\omega$ is the angular velocity beytween the rotor and the stator for p=1 (p=number of pole pairs). The other terminal of the rotating voltage source 15 forms the second terminal of the equivalent circuit diagram. The voltage space vector u is applied between the two terminals of the equivalent circuit diagram.

All of the elements of the equivalent circuit can be calculated unequivocally from each set of four parameters, from which a fundamental wave machine corresponding to assumption 1 is completely determined. The four passive elements $R_s$, $R_r'$, $L$, $L_G$ of the equivalent circuit diagram in turn unequivocally and completely describe the behavior of the associated base wave machine. Under the above-mentioned assumptions, the angular rotor frequency $\omega_r$ can be chosen as the only independently variable quantity of the system established by FIG. 3. For the voltage induced by the total flux $\psi$ we then have:

$$u\psi = d\psi/dt = d(\hat{\psi} \cdot e^{j\omega r^t})dt = j\omega_r \psi \quad (1)$$

Figure 4:
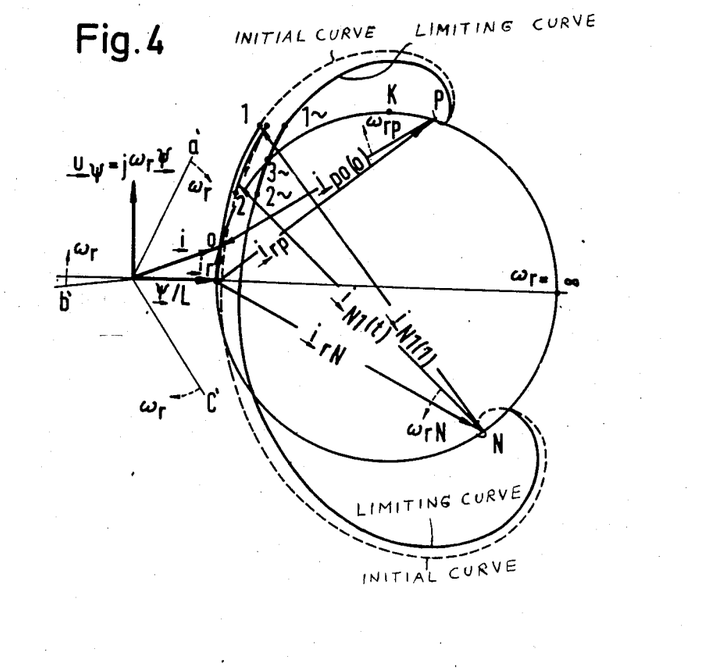
FIG. 4 is a graph of steady-state and dynamic locus curves for current space vectors in an induction machine with a constant total amount of flux.

During steady-state operation with constant rotor frequency, the rotor current $i_r$ results from the voltage $u\psi$ and the a-c admittance of the series circuit formed of the elements $L_G$ and $R_r'$. If the angular rotor frequency is varied, the circle shown in FIG. 4 is obtained as the locus curve for the current space vectors $i$ and $i_r$ which are dependent on $\omega_r$. This circle retains an unchanged position in the complex presentation plane if the three projection axes a', b', c' rotate clockwise in this plane with the angular velocity $\omega_r$.

All of the phase or leg quantities are then obtained correctly with regard to their wave-shapes, as projections of the associated space vectors onto the rotating axes. In the case of positive values of $\omega_r$, points on the part of the current locus curve lying in the first quadrant are obtained exclusively; for negative values of $\omega_r$, the phase sequence of the rotor phase quantities is reversed; for a sense of rotation of the projecting axes which is now reversed lagging rotor current space vectors exclusively formed of points in the fourth quadrant are obtained in the fourth quadrant on the lower half of the locus curve circle.

In the presentation chosen, the space vectors for the total flux $\psi$ and the magnetizing current $\psi/L$ remain unchanged. Only the component of the rotor or stator current space vector which is perpendicular to the direction of these space vectors forms a torque with a rotating component of the total flux. This component of the current space vector is therefore a direct measure of the torque.

Positive values of the torque are therefore exclusively obtained on the upper semicircle of the current locus curve; related negative torques which act clockwise are obtained on the lower semicircle. Evidence as to whether motor or generator operation is present is obtained if the sign of $\omega$ is taken into consideration, i.e. as a function of the direction of rotation of the shaft.

The space vectors of the stator and rotor current only lie on the circular locus curve shown in FIG. 4 during steady-state operation with a constant amount of $|\psi|$ of the resulting flux interlinkage and constant angular rotor frequency $\omega_r$. Every other point of the current space vector plane corresponds to values of the two linearly independent state quantities of the three rotor currents which are also possible in principle under dynamic operating conditions. If a wave shape of the voltage u according to equation (1) with a value $\omega_{rp}$ of the rotor frequency which results in steady-state operation in the rotor currents determined by a point P on the current locus curve is chosen, then the transition into the associated periodic operating condition can be readily described from any starting condition at t=0.

The starting state for t=0 is characterized in FIG. 4 by the point 0. At this point in time, the difference between the instantaneous rotor currents and the rotor currents which flow under stationary conditions at this point in time are presented by the space vector $i_{Po}(0)$. The projections of this vector onto the rotating axes a', b', c' at the time t=0 furnish the starting values of the dynamic rotor current equalization members, all three of which decay to zero with the same time constant $L_G/R_r$ during the time which follows.

Considered relative to the rotating axes, the space vector $i_{po}(t)$ retains its direction, since all three equalization currents change so uniformly that their ratios remain the same. Only the amount $|i_{po}(t)|$ is decreased with the time constant $L_G/R_r'$. If the waveshape of the equalizing space vector $i_{po}(t)$ is followed relative to the locus curve circle which is stationary in FIG. 4, a vector rotating clockwise with the constant angular velocity $\omega_{rp}$ is obtained, with a magnitude which goes toward zero according to an exponential function with the time constant $L_G/R_r'$. The track curve of the equalizing vector $i_{po}(t)$ is therefore a spiral, the conversion center of which is at the point P.

As may seen from FIG. 4, the component $i_r(t)$ orthogonal to $\psi$ and therefore the torque of the machine, grows very fast after t=0. If the stator voltage is changed upon reaching point 1 on the equalization curve in such a way that the angular rotor frequency assumes the large negative value $\omega_{rN}$, the stationary point N on the locus curve circle is associated with this new angular rotor frequency. This point is now the point of convergence of the new equalization space vector $i_{N1}(t)$, the magnitude of which also decreases exponentially with the time constant $L_G/R_r'$ which, however, rotates counterclockwise with the angular velocity $\omega_{rN}$, because the projection axes a', b', c' then also rotate in this sense. As may be seen directly, the torque of the machine now decreases very quickly. If the angular rotor frequency is again made equal to $\omega_{rp}$ at the point 2 of the new equalization spiral, the initially described processes are repeated with somewhat larger overall values of the component of the rotor current space vector $i_r$ lying in the direction of $\psi$.

If the method of switching between the angular rotor frequencies $\omega_{rp}$ and $\omega_{rN}$ is continued in the manner described above each time that the same upper or lower torque value is reached, a stationary limit cycle of the equalizing locus curves with the limit cases shown in FIG. 4 is obtained. The starting and ending points of the cyclically traversed sections of both equalization spirals coincide and are designated in FIG. 4 with reference symbols 1~ and 2~. The partial sections located inbetween the two equalization locus curves are so close together that no difference can be noted in FIG. 4. Point 3~ is associated with the fundamentals of the three rotor curves, and it lies on the circular locus curve.

If the magnitude of the angular rotor frequencies $\omega_{rp}$ and $\omega_{rN}$ are large as compared to the angular rotor frequency $\omega_{rk}$ at the stationary flipping, tilting or sweeping point K for constant total flux, the rate of change of the components of the rotor current space vector perpendicular to $\psi$ are practically independent of the rotor resistance $R_r'$, and only depend on the ratio $\psi/L_G$. This means that the parameter $R_r'$ which is operationally variable over wide limits has no appreciable influence on the dynamics in the event of fast changes of the torque.

Figure 5:
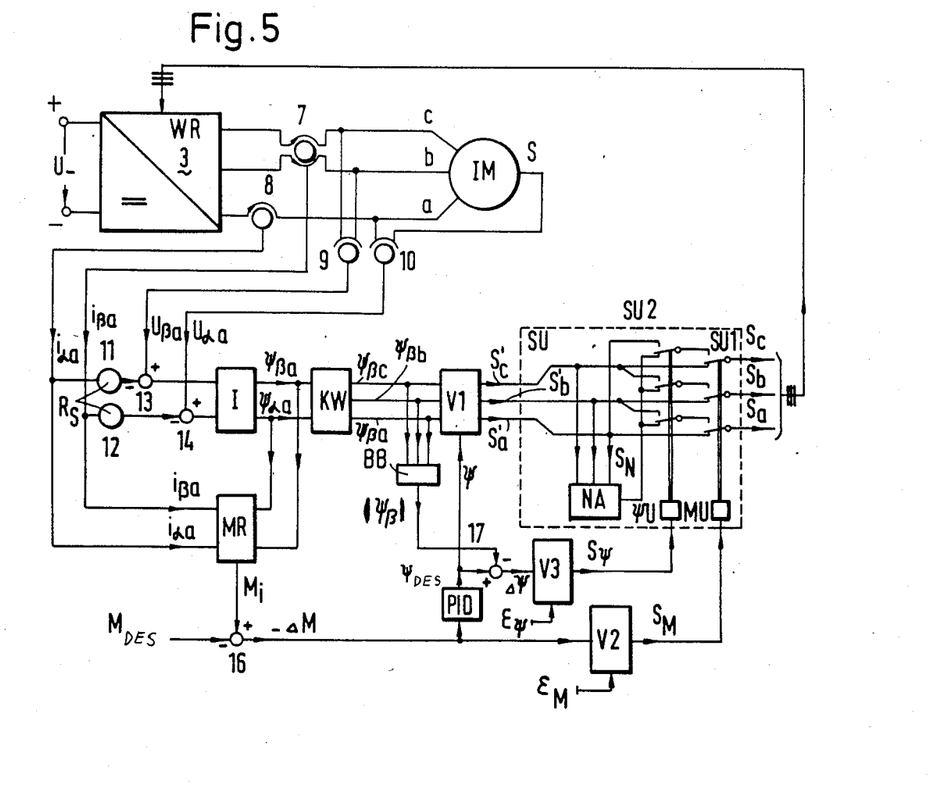
FIG. 5 is a schematic circuit diagram of a signal processing device for direct self-control of torque and flux of a rotating-field machine.

On the basis of the above-described processes for sudden changes of the angular flux velocity, a very simple direct self-regulation of the torque can be provided with excellent dynamics. In this connection FIG. 5 shows the structure of the signal processing device for the direct self-regulation of the torque and the flux of a rotating-field machine.

The circuit which includes the units WR, IM, I, KW, V1, and 7 to 14 is constructed as described in connection with FIG. 2. In addition, the stator current components $i\alpha_a$, $i\beta_a$ and the flux components $\psi\beta_a$, $\psi\alpha_a$ are fed to a torque computer MR which forms the actual value of the inner torque $M_i$ from the waveform of the stator currents and the resultant flux linkages.

The inner torque of a rotating field machine can then be calculated in accordance with the following relation:

$$M_i = 1.5(\psi\alpha_a \cdot i\beta_a - \psi\beta_a \cdot i\alpha_a) \quad (2)$$

In the expanded signal processing structure shown in FIG. 5, this quantity formed in the torque computer MR is compared in a comparator 16 with the torque reference or desired value $M_{DES}$ which can be set in. In the fundamental wave speed range, a simple regulation is then obtained according to the following instruction:

If the actual value of the inner torque $M_i$ exceeds the reference value $M_{DES}$ by more than a permissible tolerance value $\epsilon_M$, the seventh space vector value with the magnitude zero must be switched on instead of the actual space vector value ($S_a'$, $S_b=S_b'$, $S_c=S_c'$) determined from the six external space vector values from the machine voltage instead of by the flux self-regulation ($S_a=S_b=S_c=S_N$) until the actual value of the torque falls below the reference value by more than $\epsilon_M$. The flux self-regulation subsequently again determines a switching state of the inverter.

In the circuit diagram of FIG. 5, the control deviation $\Delta_M = M_{DES} - M_i$ is compared with the tolerance value $\epsilon_M$ in a torque comparator V2 and the changes of the switching states are brought about by the switching variable $S_M$ delivered by the comparator V2 through the symbolically-illustrated torque-dependent switching device MU, in such a way that the double-throw switch SU1 of the signal switch SU either connects the switching state variables $S_a'$, $S_b'$, $S_c'$ through (for forming the voltage space vector values $\vec{U}_1 \ldots \vec{U}_6$) or it connects the switching state variable $\vec{S}_N$ through (for forming the voltage space vector value $\vec{U}_0$).

The seventh voltage space vector value $\vec{U}_0$ with the magnitude 0 can be provided by two different switching states. By appropriate selection criteria, secondary conditions can be met such as, for instance, minimum switching frequency or assurance of minimum switching state times, etc. In FIG. 5, this purpose is served by a zero state selector NA.

The switching state variable $S_N$ delivered by the zero state selector NA has the following values in dependence on the switching state variables $S_a'$, $S_b'$, $S_c'$:

| $S_a'$ | $S_b'$ | $S_c'$ | | $S_N$ |
|---|---|---|---|---|
| H | L | L | $\vec{U}_1$ | L |
| H | H | L | $\vec{U}_2$ | H |
| L | H | L | $\vec{U}_3$ | L |
| L | H | H | $\vec{U}_4$ | H |
| L | L | H | $\vec{U}_5$ | L |
| H | L | H | $\vec{U}_6$ | H |
| H | H | H | $\vec{U}_0$ | H |
| L | L | L | $\vec{U}_0$ | L |

(L = Low, H = High)

In the manner described above, the angular velocity of the rotating component of the resulting flux interlinkage averaged over a pulse cycle, adjusts itself automatically to the value required for generating the desired torque, and this is done without any information regarding the shaft speed, the actual values of inductances, the rotor resistance or other quantities and parameters which must be known for the conventional control methods. The slow and fast variations of the d-c input voltage U— of the inverter which as a rule are always available, are automatically and fully taken into consideration by the direct self control and thus have no effect on the torque which is kept in a tolerance band that is $2\epsilon_{ME}$ wide.

At low speeds, such as in the range below 30% of the fundamental speed, the dynamics can be further improved in the case of large negative values of the control deviation $\Delta_M$ caused by jumps of the torque reference value. In this case, the space vector value $\vec{U}_1 \ldots \vec{U}_6$ is switched on by means of the switching state variables $S_a$, $S_b$, $S_c$ instead of the voltage space vector $\vec{U}_0$ with the magnitude zero, which agrees with a value of the voltage space vector selected by the flux self control, except for the sign.

Figure 6:
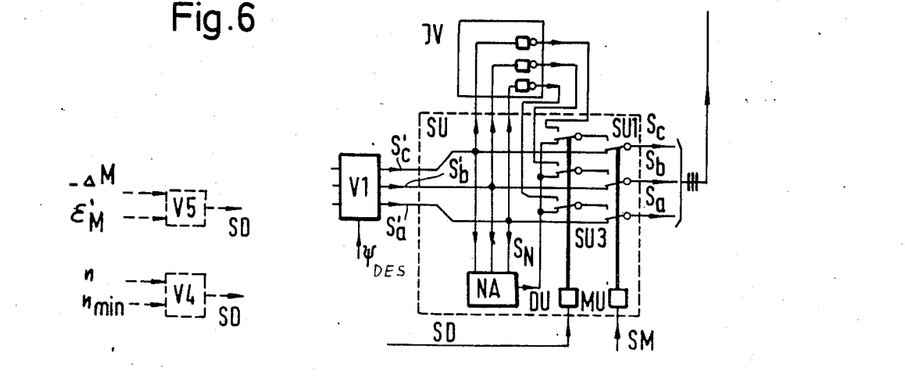
FIG. 6 is a schematic circuit diagram of a portion of a further embodiment of the device similar to FIG. 5.

In FIG. 6, an embodiment example relating thereto is shown. The double-throw switch or switch element SU1 of the signal switch SU is preceded by a double-throw switch or switch element SU3 which connects through or switches either the switching state variable $S_N$ or the inverse switching state variables $\bar{S}_a'$, $\bar{S}_b'$, $\bar{S}_c'$. An inverter ]V is provided for forming the inverse variables $\bar{S}_a'$, $\bar{S}_b'$, $\bar{S}_c'$. The double-throw switch SU3 is addressed by a speed-dependent switching device DU. In order to measure low speeds (for instance below 30% of the basic speed) a comparator V4 is provided, which feeds a switching variable SD to the switching device DU if low speed is present ($n_{ACT}$=the actual value of the shaft speed and $n_{min}$=limit for low speeds, such as 30% of the fundamental speed). As an alternative thereto, the switching variable SD can also be formed by a comparator V5, to which the control device $\Delta_M$ and a tolerance value $\epsilon_M'$ are fed on the input side, wherein $\epsilon_M' > \epsilon_M$. This embodiment has the advantage that the speed need not be measured.

If the inverse switching state variables are given, the total flux space vector not only stands still but it moves along a track curve just traversed with full velocity in a direction opposed to the previous one. In this manner, large negative values of the rotor frequency $\omega_r$ can be achieved, for instance, even for a very small positive angular velocity of the shaft, which are necessary if the torque is to be reduced quickly.

At stationary operating points, the actual value of the torque oscillates about the desired reference value in saw tooth-fashion with the amplitude $\epsilon_M$. The duration of a pulse cycle is approximately proportional to the width $2\epsilon_M$ of the oscillation. The proportionality constant depends primarily on the speed of rotation. The maximum value is obtained approximately at one half the fundamental speed. In the range of this speed of rotation there is therefore a limit for the quantity $\epsilon_M$ which must not fall below a given value in consideration of the highest permissible pulse frequency of the inverter used. The associated torque pulsation is due to the properties of the inverter and can at best be reached during controlled operation, as in the case in direct self-regulation but can never fall below.

At the instants determined by the flux self-control, at which switching to a new external value of the voltage space vector takes place for the first time, the flux space vector lies exactly on the straight line of the flux track curve defined by the origin distance $\psi_{DES}$. However, within the time for the change to the next curve section, the flux space vector does not follow the reference line exactly. The reason for this is the voltage $\vec{i} \cdot R_S$ which occurs at the stator winding resistances. The magnitude of the flux space vector is reduced when traversing the true track curve section as compared to the values which would be obtained on the associated ideal straight track line. The deviation grows with time which passes until the next new track section is reached, which is to say that for a constant reference value $\psi_{DES}$, the mean value of the flux magnitude drops with the stator frequency.

The flipping, tilting or tipping moment or pull-out torque which may be attained, depends on the magnitude of the flux by a square law. If the full pull-out torque is desired, it is no longer sufficient at very low stator frequencies to only bring the magnitude of the flux to the correct value six times per period. Therefore, the direct flux self-regulation is discussed below for the flux magnitude at low stator frequencies.

The outout voltages of a three-phase inverter represent a system of two independent controlled quantities. In the ideal case, two quantities of a induction machine could be tracked thereby without error, with predetermined reference wave shapes and within the constraints given by the magnitude limits of the control variable.

In the conventional field-oriented control methods, for instance, the reference wave shapes for the rotor flux magnitude and the torque are given; the stator currents must then be accepted since they are obtained automatically and in the ideal case must be impressed exactly in this form by means of the inverter voltages of the machine.

With the method of direct self-regulation described so far, it should likewise be possible in the ideal case ($\epsilon_M \to 0$) to obtain a desired wave shape of the torque and a flux quantity, without error. The flux quantity is the kind of flux space vector track curve section determined by the self-regulation with the parameter $\psi_{DES}$ which can be freely preset as to its wave shape. Since only two independent control variables are available, other conditions which cannot be met by setting-in $\psi_{DES}(t)$ can also not be permitted for $\epsilon_M \to 0$.

The real two-point (bang-bang, flicker or flip-flop) control of the torque with $\epsilon_M > 0$ is now characterized by the feature that if the actual value of the torque is within the tolerance band with the finite width $2\epsilon_M$, the controlled variable state never needs to be changed but can be changed. With a kind of time multiplex process, it is therefore practically possible to track a further, third quantity to a reference value with a tolerated error which in principle can be given freely. Through the additional two-point control of a quantity $|\psi\beta|$ formed from the flux components $\psi\beta_c$, $\psi\beta_b$, $\psi\beta_a$ by a magnitude former, for instance, it is possible to prevent the true track curve of the flux space vector from deviating at low stator frequencies, within one sixth of the period to a greater extent than can be tolerated from the ideal straight track line leading through the common origin point. It is advantageous to let this third control act only in the time intervals of one pulse cycle, in which the torque changes relatively slowly at low speeds of revolution of the shaft.

In FIG. 5, an embodiment of a signal processing structure is shown which makes this possible. Additionally, a comparison point 17 is provided, at which the quantity $|\psi\beta|$ and $\psi_{DES}$ from a controller PID are present and which delivers the control deviation $\Delta\psi = \psi_{DES} - |\psi\beta|$ to a flux comparator V3. The tolerance value $\epsilon\psi$ is applied to the comparator V3 on the input side. On the output side, the comparator V3 delivers the switching variable $S\psi$ to a flux-dependent switching device $\psi U$.

If the output signal $|\psi\beta|$ of the magnitude former BB falls below the reference value $\psi_{DES}$ by more than the permitted tolerance value $\epsilon\psi$, the switching signals $S_a'$, $S_{b'}$, $S_{c'}$ shifted by 120° are passed on to the switching device MU by the double throw switch SU1 through the associated comparator V3, while being triggered by the signals $S\psi$ at the switching device $\psi U$ with the switch SU2, instead of the switching signal $S_N$. If this switching device is also activated by its comparator V2, then $S_a = S_b'$; $S_b = S_c'$; $S_c = S_a'$, i.e. the machine is given a value of the voltage space vector which has a lagging angular position difference of 120° relative to the value which was effective in the first partial interval of the pulse cycle.

Instead of stopping, the flux space vector as a consequence moves with full speed in a direction which is changed by about 120° relative to the desired straight track line. On the new track, the magnitude of the actual $\psi\beta$ . . . component increases very quickly. If the torque should fall below its reference value by more than $\epsilon_M$ in the meantime, the process is immediately broken off by the switching device MU, i.e. the torque control has priority. Otherwise, the increase of the amount of flux is terminated only via the switching device $\psi U$, if the quantity $|\psi\beta|$ reaches the origin distance $\psi_{DES}$. In this manner, the true track curve of the flux space vector is always kept very close to the straight track reference line even for arbitrarily low stator frequencies. The flux magnitude is only slightly changed to the extent required by the hexagonal form of the flux track curve.

The magnitude of the actual $\psi\beta$ . . . component can be enlarged not only by means of a voltage space vector value which lags relative to the value chosen by the flux self-control by 120°, but this also happens in the case of a voltage space vector value which lags by only 60°. The desired effect can therefore always be obtained for two different switching states of the inverter. Additional secondary conditions can be taken into consideration by appropriate selection criteria such as with zero state selector.

Figure 7:
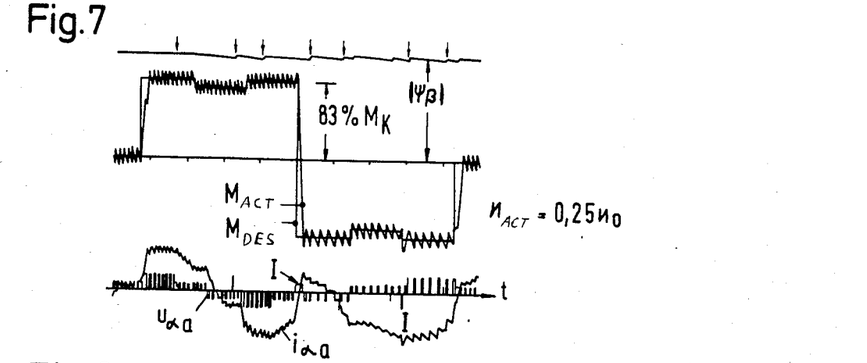
FIGS. 7, 8 and 9 are graphs of wave shapes of important quantities for fast torque changes of a short-circuit rotor machine.
Figure 8:
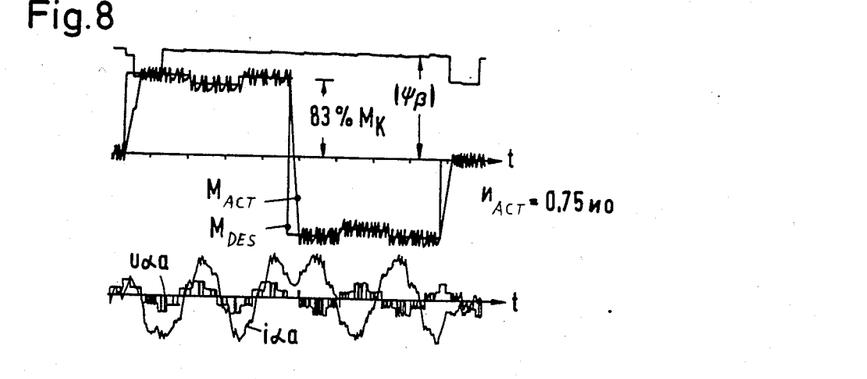
Figure 9:
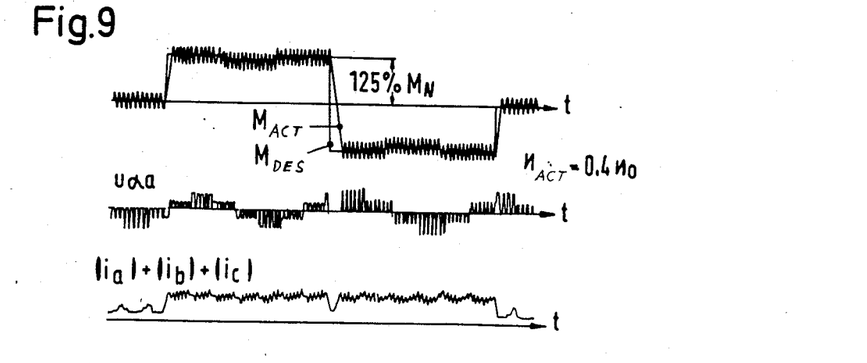

In FIGS. 7, 8 and 9, the wave shapes of important quantities are shown for fast torque changes of a short circuit rotor machine. The pulse frequency $f_p$ is then always $3 \times 300$ Hz and the nominal frequency value $f_o$ is 60 or 50 Hz. In FIGS. 7 and 8 respectively show the flux curve $|\psi\beta|$, the waveshapes of the torque reference value $M_{DES}$, the actual torque value $M_{ACT}$, the Y voltage or voltage to neutral $U\alpha_a$ and the conductor current $i\alpha_a$.

In FIG. 7, the torque reference value $M_{DES}$ is changed between the value 83% $M_K$ and 75% $M_K$ ($M_K$=pull-out torque). The actual speed value $n_{ACT}$ is 0.25$n_0$ ($n_0$=fundamental speed of rotation). Arrows at the flux curve $|\psi\beta|$, characterize the short time intervals in which the quantity $|\psi\beta|$ is increased to its reference value by a two point control in the manner described above. At the other points, non designated points, with a steep rise of the quantity $|\psi\beta|$, this is accomplished by the above-described flux self-control. At the points of the voltage curve marked with reference symbol I, the direction of rotation of the rotating field relative to the stator is reversed for a short time for the required fast reduction of the torque.

In FIG. 8, the torque reference value $M_{DES}$ is likewise changed between the values 83% $M_K$ and 75% $M_K$. However, the actual speed value $n_{ACT}$ is 0.75 $n_0$. It can be seen that with the required fast increases of the torque $M_{DES}$, the flux $|\psi\beta|$ is considerably reduced dynamically. Only in this manner, can large positive values of the rotor slippage be achieved at speeds $n_{ACT}$ which are noticeably above one half the basic speed of revolution $n_0$.

In FIG. 9, the waveforms of the torque reference value $M_{DES}$, of the actual torque value $M_{ACT}$, of the Y voltage or voltage to neutral $U\alpha_a$ and of the sum of the three converter currents $|i_a|+|i_b|+i_c|$ are shown. The torque reference value $M_{DES}$ is varied beteen the values 112.5% $M_N$ and 125% $M_N$ ($M_N$=nominal torque). The actual value of the speed $N_{ACT}$ is 0.4$n_0$. The curve of the sum of the current shows how direct control of the flux and the torque automatically prevents the peak values of the three converter currents $|i_a|+|i_b|+|i_c|$ from becoming larger than at comparable stationary operating points, even for dynamic processes.

The foregoing is a description corresponding in substance to German Application No. P 31 34 936.6, dated Oct. 20, 1984, the International priority of which is being claimed for the instant application, and which is hereby made part of this application. Any material discrepancies between the foregoing specification and the aforementioned corresponding German application are to be resolved in favor of the latter.

I claim:

1. Apparatus for controlling a rotating-field machine, comprising: an inverter having an output voltage system being connected to the rotating-field machine and being variable with respect to amplitude, phase and frequency; an integrator connected to said inverter and a component converter connected to said integrator for forming amplitudes of stator flux components from measured stator current components and stator voltage components as actual values of a flux control loop; means for supplying a predetermined stator flux reference value; and a flux control in the form of a comparator having inputs connected to said component converter for receiving the amplitudes of the flux components and to said supplying means for receiving said stator flux reference value, and said flux control having an output connected to said inverter for delivering switching state variables for driving said inverter, said flux control changing the phase and frequency of the inverter output voltage system as a function of said stator flux reference value.

2. Apparatus according to claim 1, including a signal switch connected between said first comparator and said inverter, said signal switch including a switch element switching back and forth between the switching state variables delivered by said flux control and a zero switching state.

3. Apparatus according to claim 2, including a torque control connected to said inverter, and a torque-depending switch device connected between said torque control and said switch element of said signal switch for driving said switch element.

4. Apparatus according to claim 3, wherein said torque control is another comparator comparing a torque control deviation with a given torque tolerance value.

5. Apparatus according to claim 4, including a torque computer connected between said inverter and said torque control for forming an inner torque from the stator current components and flux components, and means for comparing the inner torque with a given torque for forming the torque control deviation.

6. Apparatus according to claim 2, wherein said signal switch includes another switch element switching back and forth between the zero switching state and a switching state variable being given by the flux control and having a lagging angle position difference of 120°.

7. Apparatus according to claim 6, including a flux-dependent switching device driving said other switch element of said signal switch.

8. Apparatus according to claim 7, including a further comparator and an amplitude former connected between said flux control and said component converter for forming the magnitude of the amplitudes of the flux components, means connected to said amplitude former for comparing the magnitude of the amplitudes of the flux components with the stator flux reference value and for feeding a flux control deviation to said further comparator, said further comparative driving said flux-depending switching device if the flux control deviation exceeds a predetermined flux tolerance value.

9. Apparatus according to claim 2, wherein said signal switch includes a further switch element switching back and forth between the zero switching state and inverse switching state variables supplied by the flux control.

10. Apparatus according to claim 9, including another inverter forming the inverse switching state variables.

11. Apparatus according to claim 9, including a speed-dependent switching device driving said further switch element of said signal switch.

12. Apparatus according to claim 11, wherein the rotating-field machine is an inducation machine, and including an additional comparator having inputs receiving a speed value of the induction machine and a minimum limit of the speed, said additional comparator driving said speed-dependent switching device.

13. Apparatus according to claim 4, wherein said signal switch includes a further switch element switching back and forth between the zero switching state and inverse switching state variables formed by another inverter and supplied by said flux control, and including a speed-dependent switching device driving said further switch element, and an added comparator driving said speed-depending switching device, said added comparator having inputs receiving the torque control deviation and another torque tolerance value, the other torque tolerance value being larger than the first-mentioned torque tolerance value.

14. Apparatus according to claim 4, wherein said supplying means are in the form of a controller forming said stator flux reference value from the torque control deviation.

15. Apparatus according to claim 2, including a zero state selector forming the zero switching state as a function of the switching state variable delivered by the flux controller.

* * * * *